United States Patent [19]

Gilead

[11] 4,195,784
[45] Apr. 1, 1980

[54] THREE LAYER IRRIGATION TUBE AND APPARATUS AND METHOD FOR PRODUCING SAME

[76] Inventor: Gideon Gilead, P.O.B. 26025, Jerusalem, Israel

[21] Appl. No.: 814,727

[22] Filed: Jul. 11, 1977

[30] Foreign Application Priority Data

Sep. 28, 1976 [DE] Fed. Rep. of Germany ....... 2643710

[51] Int. Cl.² .............................................. B05B 15/00
[52] U.S. Cl. ..................................................... 239/542
[58] Field of Search ................. 239/145, 450, 542, 547

[56] References Cited

U.S. PATENT DOCUMENTS

| 3,672,571 | 6/1972 | Goodricke | 239/145 |
| 3,830,067 | 8/1974 | Osborn et al. | 239/145 |
| 3,866,833 | 2/1975 | Shibata et al. | 239/547 X |
| 3,870,236 | 3/1975 | Barragan | 239/542 |
| 3,896,999 | 7/1975 | Barragan | 239/542 X |
| 4,009,832 | 3/1977 | Tiedt | 239/542 |

Primary Examiner—John J. Love
Attorney, Agent, or Firm—Browdy and Neimark

[57] ABSTRACT

Drip irrigation apparatus comprising first, second and third layers of sheet material, the layers of sheet material being elongate and arranged that both of their side edges lie in confronting and coextensive arrangement, the first, second and third layers being joined to each other at their side edges to define a water supply passage between the first and second layers and to define a water discharge passage between the second and third layers, the second layer being apertured to provide fluid communication between the water supply passage and the water discharge passage. A method and apparatus for producing the drip irrigation apparatus is also provided.

28 Claims, 16 Drawing Figures

THREE LAYER IRRIGATION TUBE AND APPARATUS AND METHOD FOR PRODUCING SAME

FIELD OF THE INVENTION

The invention relates to a foil tube for drop irrigation consisting of at least three foils joined together which form a water supply passage and a water discharge passage, openings for the passage of water being provided in the foil present between the water supply passage and the water discharge passage and in the foil outwardly defining the water discharge passage.

The invention also relates to a method and an apparatus for producing such a tube of foil or sheet material.

BACKGROUND OF THE INVENTION

A foil tube of the aforementioned type is for example known from U.S. Pat. No. 3,870,236 (FIGS. 5,6). The water supply channel in this case is formed by two foils welded together at their longitudinal edges. One of these two foils is additionally welded to a substantially narrower third foil and forms with the latter the water discharge passage provided with direction changes. The production of such a foil tube must be carried out in several stages; in particular, the welding of the three foils can be done only in two successive operations.

The problem underlying the invention is thus to develop a foil tube of the aforementioned type for drop irrigation which can be produced in a particularly simple manner.

SUMMARY OF THE INVENTION

According to the invention this problem is solved in that the centre foil of the tube made from three foils is joined substantially in the same zone of its two outer surfaces to the two other foils.

As will be explained hereinafter with the aid of the description of the examples of embodiment, this form permits not only a simultaneous bonding (for example welding) of the three foils in a single operation but in particular permits foil tubes of different water supply passage diameter to be made whilst using the same particularly complicated parts of the machine for producing such tubes and replacing only a few simple components.

The machine used to make the foil tube according to the invention contains expediently at least one vacuum deep-drawing roll which is provided at its periphery with a plurality of parallel profile rows each intended to form a water discharge passage and which preferably comprises in a portion of its periphery a vacuum zone.

Furthermore, the machine according to the invention preferably contains a form roll which is provided at its periphery with parallel grooves and—for the purpose of producing foil tubes of different water supply passage diameter—may be replaced by other form rolls of the same groove interval but different groove depth.

These and numerous further features are the subject of the subsidiary claims and will be explained hereinafter in conjunction with the description of some examples of embodiment.

DETAILED DESCRIPTION OF THE INVENTION

Figure 1:
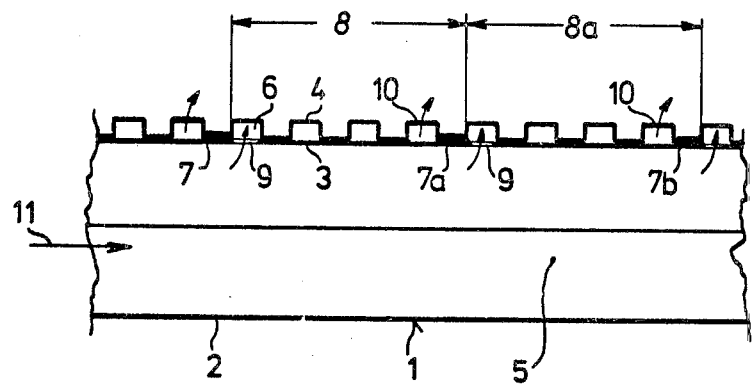
FIG. 1 is a schematic longitudinal section through a foil tube divided into a plurality of portions.

The foil tube 1 illustrated diagrammatically in FIG. 1 consists, as will be explained in detail hereinafter, of three foils 2, 3,4 and comprises a water supply passage 5 formed by the foils 2 and 3 and a water discharge passage 6 formed by the foils 3 and 4.

As will be explained in detail hereinafter, the water discharge passage 6 comprises a plurality of direction changes and is interrupted at certain intervals, for example at the points 7, 7a, 7b etc. The water discharge passage 6 is divided in this manner into individual portions 8, 8a etc.

At one end of each portion the water discharge passage 6 communicates with the water supply passage 5 through an opening 9 provided in the foil 3; at the other end of the respective section an opening 10 is provided in the foil 4. These openings 9 and 10 may for example be formed as slots.

The water (arrow 11) supplied through the water supply passage 5 enters through the openings 9 into the water discharge passage 6, flows through the water discharge passage 6, changing direction several times (the flow energy of the water thus being used up in desired manner) and discharges in drops through the openings 10.

Figure 3:
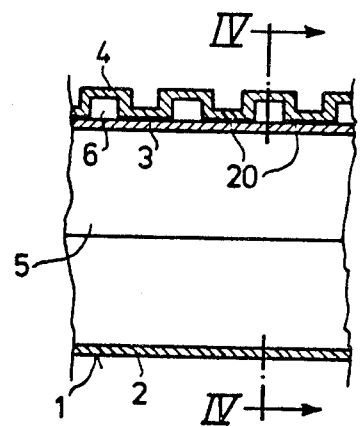
FIG. 3 is a longitudinal section along the line III—III of FIG. 2.
Figure 2:
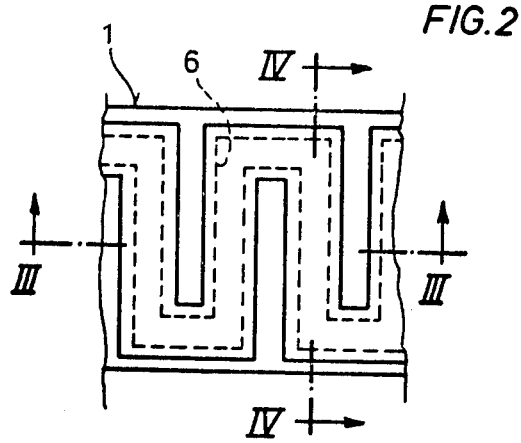
FIG. 2 is a plan view of a portion of the foil tube according to the invention.
Figure 4:
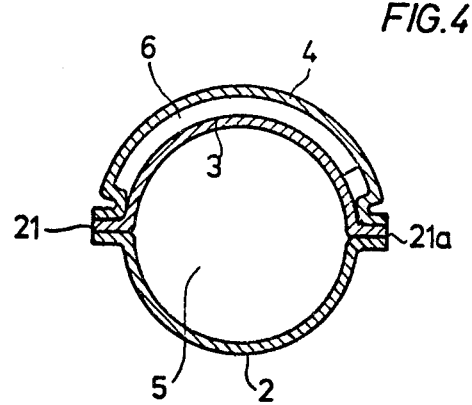
FIG. 4 is a cross-section along the line IV—IV of FIGS. 2 and 3.

With reference to FIGS. 2 to 4 the structure of the foil tube according to the invention will now be explained in detail. Whereas the foils 2 and 3 have a substantially smooth (approximately semicircular in operation) shape, the foil 4 is profiled. It is given in the example of embodiment illustrated a border-like water discharge passage 6 with repeated reversal of direction which is formed by a corresponding profiling of the foil 4 and is defined on the inside by the foil 3. It is stressed that the form of the water discharge passage 6 illustrated in FIG. 2 is to be regarded only as an example; numerous modifications of the form and path of this water discharge passage are possible within the scope of the invention.

According to the invention, the three foils 2, 3 and 4 are bonded together in the manner shown in FIG. 4; the centre foil 3 is bonded with its two surfaces substantially in the same zone to the two other foils 2 and 4. The longitudinal edges of the three foils 2, 3 and 4 lie in other words on each other and are bonded together (which is done in the case of plastic sheets of foils preferably by welding or adhering).

Figure 5:
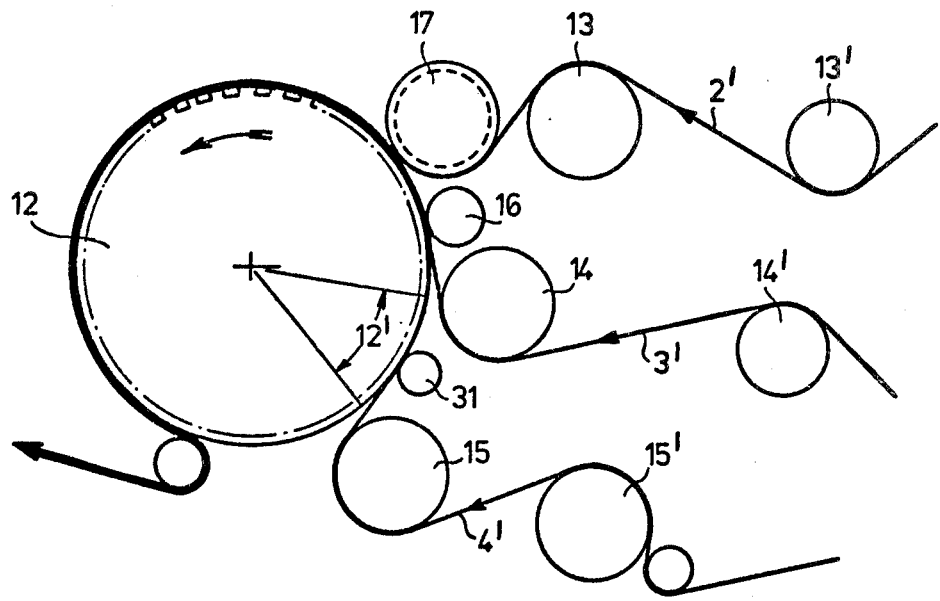
FIG. 5 is a schematic illustration of a machine for producing the foil tube according to the invention.
Figure 6:
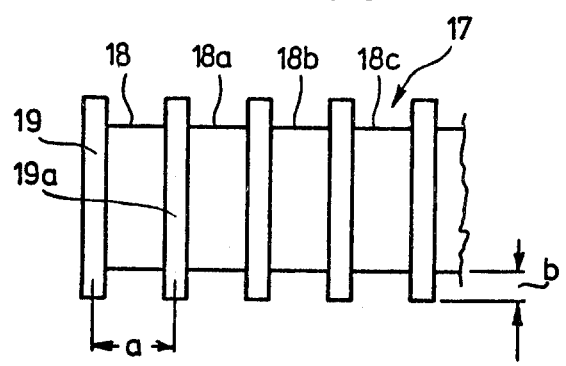
FIG. 6 is a elevation of the form roll of the machine according to FIG. 5.

FIGS. 5 and 6 show an apparatus for making the foil tube according to the invention. The apparatus illustrated in FIG. 5 comprises a vacuum deep-drawing roll 12 which is provided at its periphery with a plurality of parallel profile rows each of which is intended to produce a water discharge passage 6. This vacuum deep-drawing roll 12 thus produces in a foil web 4' a plurality of adjacent depressions running in border-like manner (each forming a water discharge passage 6), this being done in the vacuum deep-drawing process. The foil web 4' is thus given an appearance as illustrated schematically in FIG. 7 on passing the vacuum zone 12'.

The apparatus according to FIG. 5 further comprises a plurality of heating drums 13, 13', 14, 14', 15, 15' for heating the foil webs 2', 3' and 4', and a pressure and cutting roll 16 for cutting and pressing the foil web 3' on the foil web 4' formed on the vacuum deep-drawing roll 12 and a cutting roll 31 for producing the necessary slots in the foil web 4'.

Figure 7:
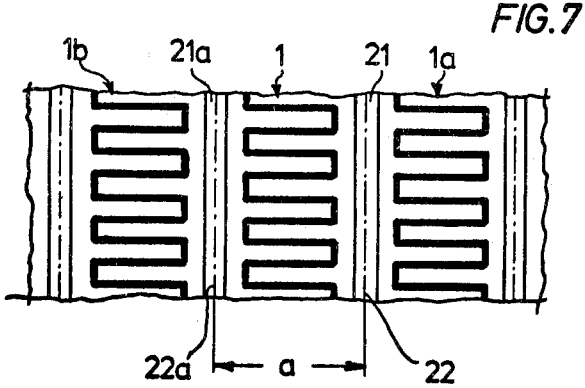
FIG. 7 is a plan view of a foil material strip before separating into a plurality of foil tubes.

The apparatus according to FIG. 5 is also provided with a form roll 17 which is shown in detail in FIG. 6. It comprises at its periphery a plurality of parallel grooves 18, 18a, 18b, 18c which are separated from each other by individual webs 19, 19a, etc. The interval a between the adjacent webs 19, 19a corresponds to the width of a foil tube (in the flat superimposed condition of the three foils; this interval a is also indicated in FIG. 7). The depth b of the individual grooves 18, 18a, etc. determines, as will be explained in detail with the aid of FIGS. 8 to 13, the magnitude of the water supply passage 5 enclosed by the foil 2.

The above explanations should make the production of the foil tube with the apparatus according to FIG. 5 readily understandable; in the foil web 4' the profiles are formed when the web runs onto the vacuum deep-drawing roll 12 and these profiles later represent the water discharge passages 6 of the individual foil tubes. The foil web 3', which is also highly preheated, then runs onto the foil web 4' and is pressed on by the pressure roll 16 and welded to the foil web 4' at the points at which these webs are in contact (for example in the zones 20, cf. FIG. 3). The foil web 2' then applied is pressed by the form roll 17 onto the foil web 3' so that the webs 19, 19a etc. of the form roll 17 establish in the regions of the zones 21, 21a (cf. FIGS. 4 and 7) a weld bond between these three foil webs 2', 3', 4'.

Cutting means not illustrated in detail in FIG. 5 then cut the three bonded foil webs into individual foil tubes (e.g. 1, 1a, 1b). The cut is effected in each case in the region of the welded zones 21, 21a, etc. (cut line 22 22a). The cutting means for cutting the welded foil webs into individual foil tubes may either be provided directly on the vacuum deep-drawing roll 12 or formed by a separate cutting means which cuts the foil webs during their transport to the deep-drawing roll 12.

In the example of embodiment illustrated the openings (10 according to FIG. 1) to be formed in the foil web 4' are produced by the cutting roll 31 and the openings (9 according to FIG. 1) to be provided in the foil web 3' by the pressure and cutting roll 16. It is obvious that these rolls must run synchronously with the vacuum deep-drawing roll 12.

FIGS. 8 to 13 show how foil tubes 1, 1' or 1" with different sized water supply channel 5, 5', 5" can be made with the apparatus according to FIG. 5, in particular whilst retaining the vacuum deep-drawing roll 12, simply by replacing the form roll 17. The form roll 17 is replaced for this purpose by another form roll which has the same groove interval a but different groove depth b. Accordingly, the profile of the foils 2, 2', 2" shaped by the form roll 17 is of different depth (the form roll 17 may for example be at the same time a vacuum deep-drawing roll or constructed as a simple heated embossing roll which can cooperate with a correspondingly profiled counter roll).

Figure 8:
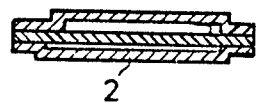
FIGS. 8, 9, and 10 are cross sections through three foil tubes of different water supply passage cross-section (in the form immediately after production)
Figure 9:
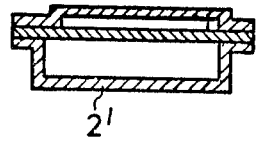
Figure 10:
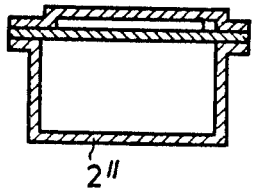
Figure 11:
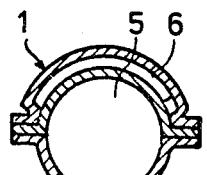
FIGS. 11 to 13 show the cross-sections of the foil tubes of FIGS. 8 to 10 in operation.
Figure 12:
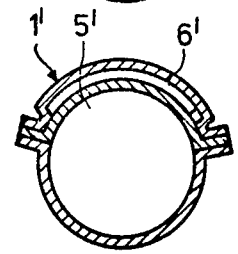
Figure 13:
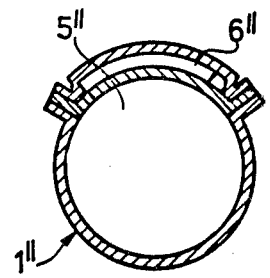

FIGS. 11 to 13 illustrate the substantially circular shape cross-section which the foil tubes according to FIGS. 8 to 10 assume in operation under the action of the inner water pressure. The three foil tubes 1, 1', 1" have the same water discharge passage 6 but different sized water supply passages 5, 5', 5".

It is obvious that the groove profile of the form roll 17 need not be only rectangular (as assumed in the example of embodiment illustrated) but can for example also be triangular, semicircular, oval, etc.

Figure 14:
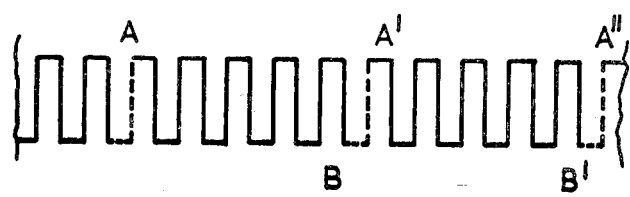
FIG. 14 is a schematic illustration for explaining possible divisions of the water discharge passage.

As explained at the beginning with the aid of FIG. 1, to achieve a uniform water discharge it is generally expedient to divide the water discharge passage 6 into individual portions. A corresponding division is provided in the surface relief of the vacuum deep-drawing roll 12, it being possible to produce water discharge passages of very different length with one and the same vacuum deep-drawing roll by using a few interchangeable elements of the profiling of the vacuum deep-drawing roll 12. FIG. 14 illustrates for example the possibility of interrupting the water discharge passage shown therein at predetermined points (e.g. between B and A' or between B' and A"). It is further possible by suitably adjusting the cutting means to adapt the number and location of a water entrance and water discharge openings 9 and 10 respectively to the particular requirements.

The foil tube according to the invention thus has a modular structure which makes it possible, with one and the same apparatus (replacing only a few simple components), to make foil tubes of very different diameter and with very different water discharge capacities.

The foil tube according to the invention may be made from plastic, metal, paper or combinations of these materials (in particular materials laminated with plastic). The provision of reinforcing inserts may be advantageous.

According to a convenient further development of the invention, for example, in the region of the two bonding zones of the superimposed foils at least one reinforcing element extending in the longitudinal direction of the tube is provided, preferably a wire, filament or strip of plastic, glassfibre or metal, disposed between the foils welded or adhered together. The starting product for making the foil tube according to the invention may also be extruded material webs in the hot-plastic state.

Whereas furthermore in the examples of embodiment described the profiled foil forming the water discharge passage forms one of the two outer foils of the foil tube made from three foils, it is possible within the scope of the invention for the arrangement to be one in which the profiled foil forming the water discharge passage represents the inner foil of the foil tube.

The water discharge passage may have various configurations within the scope of the invention; in particular, it need not necessarily be provided with direction reversals. The water discharge amount is in any case not determined by the size of the openings provided in the foils but by the length, cross-section and form of the water discharge passage.

Figure 15:
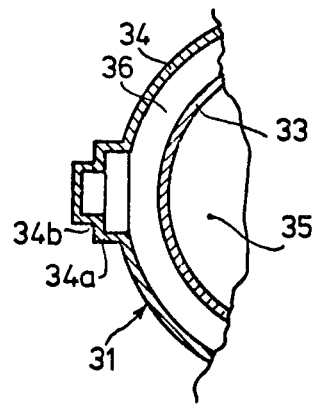
FIG. 15 is a partial section through a foil tube used for furrow irrigation.

FIG. 15 illustrates in partial section a foil tube according to the invention which has substantially greater dimensions for the tube diameter, passage cross-sections and water openings so that it may be used for furrow irrigation. The tube 31, made in the manner already explained from three foils, comprises a water supply passage 35 and a water discharge passage 36; the latter is defined by the profiled foil 34 and the foil 33. The foil 34 is provided at certain longitudinal intervals with outwardly projecting protuberances 34a, of which the outer portion substantially at the point 34b may be cut off to form water passage openings. This cutting off may for example be done at the place of use (taking account of the particular local requirements).

Figure 16:
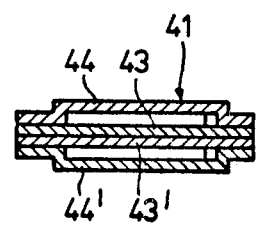
FIG. 16 is a cross-section through a foil tube made from four foils.

Finally, FIG. 16 shows an example of embodiment of a foil tube 41 according to the invention which is made from two halves, each of which consists of a profiled foil 44 or 44' and a cover foil 43, 43'. All four foils are bonded together substantially in the same zone in the region of their longitudinal edges. Such a foil tube thus has a water supply passage defined by the foils 43, 43' and two water discharge passages formed by the profiled foils 44, 44'. Production may be carried out for example by first making a profiled foil on a vacuum deep-drawing roll and then applying a cover foil, thereafter bonding two such structures by superposition in the manner apparent from FIG. 16.

I claim:

1. Irrigation apparatus comprising:
   first, second and third layers of liquid impermeable flexible foil;
   the peripheral edges of said first, second and third layers of flexible foil being arranged in substantially mutually coextensive arrangement and being joined together to define first and second longitudinal seams and to define a water supply passage between said first and second layers and a water discharge passage between said second and third layers;
   said second layer being apertured to provide fluid communication between said water supply passage and said water discharge passage;
   at least one of said second and third layers of flexible foil being embossed to provide at least one raised groove pattern in the form of an elongated path having walls defined by said at least one of said second and third layers and including a plurality of protruding adjacent communicating portions, the walls of said adjacent communicating portions being separated from each other by intermediate areas at which said second and third layers of flexible foil lie in touching relationship and are fused together, said groove pattern defining said water discharge passage.

2. Apparatus according to claim 1 wherein said third layer is provided with protuberances which when cut off form openings for the passage of water from said water discharge passage.

3. Apparatus according to claim 1 wherein said third layer is provided with openings for the passage of water from the water discharge passage.

4. Apparatus according to claim 1 and also comprising a fourth layer of sheet material having peripheral edges joined to the respective peripheral edges of said first, second and third layers so as to define a second water discharge passage between said first and fourth layers.

5. Apparatus according to claim 4 wherein said fourth layer is formed with outwardly projecting protuberances which when cut off define openings for the passage of water from said second water discharge passage.

6. Apparatus according to claim 4 wherein said fourth layer is formed with openings for the passage of water from said second water discharge passage.

7. Apparatus according to claim 1 wherein said peripheral edges are joined together by adhesive means.

8. Apparatus according to claim 1 wherein at least one reinforcing element is provided in association with each of said first and second longitudinal seams.

9. Apparatus according to claim 8 wherein said reinforcing element comprises a filament.

10. Apparatus according to claim 1 wherein said third layer is embossed to define said water discharge passage.

11. Apparatus according to claim 1 wherein said second layer is embossed to define said water discharge passage.

12. Apparatus according to claim 4 wherein said fourth layer is embossed to define said second water discharge passage.

13. Apparatus according to claim 1 wherein said second and third layers are configured to define a plurality of separate water discharge passages which do not communicate one with the other and are longitudinally separated one from the other.

14. Apparatus according to claim 1 wherein said first, second and third layers of sheet material comprise plastic laminates.

15. Apparatus according to claim 14 wherein said plastic laminates comprises reinforcing elements.

16. A method of producing drip irrigation apparatus comprising the steps of:
   providing first, second and third layers of liquid impermeable flexible foil;
   embossing at least one of said second and third layers of flexible foil to provide at least one raised groove pattern in the form of an elongated path including a plurality of protruding adjacent communicating portions, said elongated path having walls defined by said at least one of said second and third layers;
   arranging said first, second and third layers of flexible foil in superimposed orientation;
   bonding said first, second and third layers of flexible foil to each other, thereby to define first and second longitudinal seams which together with said first and second layers define a water supply passage and thereby to define intermediate areas separating the walls of said adjacent communicating portions at which said second and third layers of flexible foil lie in touching relationship and are bonded together, said intermediate areas, together with said first and second longitudinal seams and said second and third layers defining a water discharge passage along said elongated path; and
   providing openings in said second layer for fluid communication between said water supply passage and said water discharge passage.

17. A method according to claim 16 and also including the step of forming on said third layer outwardly projecting protuberances which may be cut off to form openings for the passage of water from the discharge passage.

18. A method according to claim 16 and also including the step of aperturing said third layer to define openings for the passage of water from the discharge passage.

19. A method according to claim 16 and also including the step of superimposing a fourth layer of sheet material onto said first, second and third sheets and bonding said forth layer to said first second and third layers along said first and second longitudinal seams, thereby to define a second water discharge passage.

20. A method according to claim 19 and also including the step of aperturing said first layer to provide fluid communication between the water supply passage and said second water discharge passage.

21. A method according to claim 19 and also including the step of forming on said fourth layer outwardly projecting protuberances which may be cut off to form openings for the passage of water from said second discharge passage.

22. A method according to claim 19 and also including the step of forming on said fourth layer apertures defining openings for the passage of water from said second discharge passage.

23. A method according to claim 16 and also including the step of associating a reinforcing element to said first and second longitudinal seams.

24. A method according to claim 16 and also including the step of embossing one of said first, second and third layers of sheet material.

25. A method according to claim 16 and including the steps of embossing said third layer of sheet material and bonding the non-raised portions thereof to said second layer intermediate the location of said longitudinal seams to define said water discharge passageway.

26. A method according to claim 25 and also including the step of embossing said first layer to a given depth, thereby to determine the cross sectional area of said water supply passage.

27. A method according to claim 24 wherein said embossing step is effected by vacuum deep-drawing.

28. A method according to claim 25 wherein said embossing step comprises the step of defining a plurality of non-communicating water discharge passages on said third layer.

* * * * *